United States Patent [19]

Stauffer et al.

[11] Patent Number: 5,331,033
[45] Date of Patent: Jul. 19, 1994

[54] HOT MELT ADHESIVE

[75] Inventors: Daniel Stauffer, Kane, Pa.; Paul P. Puletti, Pittstown, N.J.; Thomas F. Kauffman, Easton, Pa.

[73] Assignee: National Starch and Chemical Investment Holding Corporation, Wilmington, Del.

[21] Appl. No.: 21,148

[22] Filed: Feb. 23, 1993

[51] Int. Cl.$^5$ ............................................. C08L 91/06
[52] U.S. Cl. ......................... 524/275; 524/277; 524/481; 524/484; 524/487; 524/489
[58] Field of Search ............... 524/270, 272, 275, 277, 524/487, 489

[56] References Cited

U.S. PATENT DOCUMENTS

| | | | |
|---|---|---|---|
| 3,884,786 | 5/1975 | Domine et al. | 204/159.14 |
| 4,146,521 | 3/1979 | Godfrey | 260/27 R |
| 4,167,433 | 9/1979 | Lakshmanan | 156/322 |
| 4,404,299 | 9/1983 | Decroix | 524/77 |
| 4,434,261 | 2/1984 | Brugel et al. | 524/109 |
| 4,460,728 | 7/1984 | Schmidt et al. | 524/489 |
| 4,471,086 | 9/1984 | Foster | 524/489 |
| 4,500,661 | 2/1985 | Lakshamanan | 524/77 |
| 4,567,223 | 1/1986 | Ames | 524/489 |
| 4,631,308 | 12/1986 | Graham et al. | 524/272 |
| 4,752,634 | 6/1988 | Goss | 524/271 |
| 4,816,306 | 3/1989 | Brady et al. | 428/36.92 |
| 4,874,804 | 10/1989 | Brady et al. | 524/100 |

OTHER PUBLICATIONS

"Ethylene-n-butyl Acrylate Resins for Adhesive Formulating", Preliminary Information Report, U.S.I. Chemicals.

"Hot melts in recycled packaging", E. M. Wise, Editorial, Tappi Journal, Sep. 1990.

*Primary Examiner*—Paul R. Michl
*Assistant Examiner*—LaVonda R. DeWitt
*Attorney, Agent, or Firm*—Ellen T. Dec

[57] ABSTRACT

Hot melt packaging adhesive compositions consisting essentially of 20 to 50% by weight of an ethylene n-butyl acrylate copolymer containing 25-45% by weight, preferably 30 to 40% n-butyl acrylate and having a melt index of at least 10; 30 to 60% of an aliphatic or cycloaliphatic hydrocarbon resin or hydrogenated derivative thereof or a hydrogenated aromatic hydrocarbon resin; and 10 to 30% by weight of a high melting synthetic wax provide adhesives characterized by an excellent balance of high and low temperature performance without sacrifice to machinability or thermal stability. Further, the adhesive is characterized by a low density and consequently is readily filterable in recycling systems.

18 Claims, No Drawings

HOT MELT ADHESIVE

BACKGROUND OF THE INVENTION

Hot melt adhesives are widely used in industry for various applications such as product assembly and packaging, including particularly, for use in cardboard case sealing and carton closing operations. Some of these operations (e.g., for cartons, cases or trays used for packaging molten cheese at 60° C. and its subsequent storage at freezer temperatures of −18° to −6° C. or for packaging yogurt or freshly baked goods at temperatures greater than about 40° C.) require a hot melt adhesive with exceptionally high heat resistance (ability to maintain a fiber tearing bond at elevated temperatures) without sacrificing good cold resistance (ability to maintain a high strength bond in the cold with no tendency to fracture). Moreover, the viscosity of such adhesives must be low enough and the set speed fast enough to give good machinability, for example, on rapid-fire, automatic equipment with short compression sections which are used in commercial case or carton operations. The thermal stability and aesthetics also must be such as to produce no charring, skin, or gel formation coupled with a small viscosity change following prolonged aging at typical operating temperatures (e.g., 200° C.) so as to minimize down time for maintenance and to provide consistent application patterns and amounts during operation. These aesthetic considerations have become more important in recent years as customers increasingly demand hot melt adhesives having pot clarity, i.e., adhesives which are clear in their molten form.

Hot melt case and carton sealing products available and in commercial use today (primarily polyethylene and ethylene vinyl acetate formulations) lack one or more of the previously described properties; (1) high temperature end use performance; (2) low temperature end use performance; (3) clean machining; (4) low viscosity; (5) desirable aesthetics (clarity); (6) satisfactory thermal stability; (7) and/or low cloud point (below 120° C.). It would therefore be an advance in the art to provide another hot melt adhesive having good bond strengths (i.e., producing fiber tear) at both high and low temperatures coupled with low viscosity, fast set speed and excellent thermal stability, machining and aesthetics.

U.S. Pat. Nos. 4,816,306 and 4,874,804 to Brady, et al., disclose that hot melt packaging adhesive compositions consisting essentially of 35 to 45% by weight of an ethylene n-butyl acrylate copolymer containing 25-45% by weight n-butyl acrylate and having a melt index of at least 50; 35 to 55% of a terpene phenolic tackifier; and 10 to 20% by weight of a high melting point synthetic wax provide adhesives characterized by an excellent balance of high and low temperature performance without sacrifice to its machinability or thermal stability. While the thermal stability properties of these adhesives are similar to commercial EVA based hot melt adhesives and are acceptable for a number of end use applications, there exist end use applications which require repeated heating and cooling of the hot melt adhesive during application where these products show poor stability. In those cases, the repeated heating and cooling has been found to produce an unacceptable level of charring in the molten adhesive pot.

Moreover, in the case of applications wherein the final product, e.g., the case or carton, will be subjected to recycling operations after use, the adhesives of the U.S. Pat. Nos. 4,816,306 and 4,874,804 have a density approximately the same as that of the recycled pulp and, as a result, filtration methods cannot be used to separate the adhesive from the pulp. The presence of any residual adhesive, often referred to as "stickies", substantially reduces the value of the recycled pulp.

SUMMARY OF THE INVENTION

We have found the aforesaid problems encountered by the adhesives described in the U.S. Pat. Nos. 4,816,306 and 4,874,804 can be overcome by the use of an adhesive consisting essentially of 20 to 50% by weight of an ethylene n-butyl acrylate copolymer containing 25-45% by weight, preferably 30 to 40%, n-butyl acrylate and having a melt index of at least 10; 30 to 60% of an aliphatic or cycloaliphatic (alicyclic) petroleum hydrocarbon resin or hydrogenated derivative thereof or a hydrogenated aromatic petroleum hydrocarbon resin and 10 to 30% by weight of a high melting point synthetic wax.

The resultant adhesives are characterized by viscosity of less than about 8000 cps at 175° C., fiber tearing bonds from Kraft paper within the range of 0 to 160° F. (approximately −18° C. to 70° C.), a Ring and Ball softening point of 100°-130° C. , a cloud point less than 140° C. and which are clear at 175° C. Further, the use of the petroleum hydrocarbon resin instead of the phenolic terpene provides adhesives which possess excellent thermal stability as characterized by surviving a 144 hour at 350° F. covered thermal aging test with no signs of char, skinning or gel formation. Moreover, the adhesives have a density less than about 0.98 and, as a result, can readily be separated from the pulp using conventional filtering operations. As such, these adhesives find particular application in the area of high speed packaging, and particularly for packaging which will be exposed to the extremes in temperature encountered in packing, transport and storage or wherein the resultant packaging material will be subjected to recycling operations.

DETAILED DESCRIPTION OF THE PREFERRED EMBODIMENTS

The ethylene/n-butyl acrylate copolymers (EnBA) useful herein are those containing from about 30 to 40% by weight n-butyl acrylate. The preferred copolymers are available from U.S.I. Chemical under the designation EA80808, EA89821 or EA89822 and Elf Atochem under the designation Lotryl HY6220 or 6270 and contain approximately 35% n-butyl acrylate by weight. Additionally, the ethylene n-butyl acrylate copolymer has a melt index (MI) of at least about 10, preferably 100 to 800. Mixtures of various EnBA copolymers falling within these ranges may also be used. The amount of the copolymer present in the adhesive varies from 20 to 50% by weight.

The tackifying resins useful in the adhesive compositions are aliphatic, or cycloaliphatic (i.e. alicyclic) petroleum hydrocarbon resins having a Ball and Ring softening point of from about 70° to 150° C.; the latter resins resulting from the polymerization of monomers consisting of primarily of olefins and diolefins; also included are the hydrogenated cycloaliphatic or aliphatic petroleum hydrocarbon resins; as well as hydrogenated aromatic petroleum hydrocarbon resins. Representative commercial resins include Wingtack Extra, an aliphatic, aromatic hydrocarbon resin from Goodyear Chemicals; Escorez 5300, a partially hydrogenated cycloaliphatic petroleum hydrocarbon resin from Exxon Chemical Company; and Eastman Resin H 100 and/or H 130, partially hydrogenated cycloaliphatic petroleum hydrocarbon resins. These resins are utilized in amounts of 30–60% by weight of the adhesive composition.

The wax used herein is a high melting (above about 100° C.) synthetic wax such as synthetic, high density, low molecular weight polyethylene waxes or "Fischer-Tropsch" wax. Suitable waxes include Bareco C-4040, a low molecular weight polyethylene wax from Petrolite, Escomer H-101 a modified polyethylene from Exxon Chemical and Polywax 1000, or 2000, and Marcus 300 low molecular weight polyethylene waxes from Petrolite and Marcus Chemical respectively. Paraflint H-1, a Sasol-SA from Moore & Munger is preferred. The wax component is utilized at levels of 10 to 30% by weight of the adhesive.

The adhesives of the invention preferably also contain a stabilizer or antioxidant. Among the applicable stabilizers or antioxidants included herein are high molecular weight hinderedphenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency, and correspondingly, its reactivity; this stearic hindrance thus providing the phenolic compound with its stabilizing properties. Representative hindered phenols include; 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)-propionate; n-octadecyl-3(3,5-di-tert-butyl-4-hydroxyphenyl)-propionate;4,4'-methylenebis(2,6-tert-butylphenol);4, 4'-thiobis(6-tert-butyl-o-cresol); 2,6-di-tert-butylphenol; 6-(4-hydroxyphenoxy)-2,4-bis(n-octyl-thio)-1,3,5 triazine; di-n-octylthio)ehtyl 3,5-di-tert-butyl-4-hydroxy-benzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites, particularly useful is distearylthiodipropionate. These stabilizers, if used, are generally present in amounts of about 0.1 to 1.5 weight percent, preferably 0.25 to 1.0%. Other additives such as plasticizers, pigments, dyestuffs conventionally added to hot melt adhesives for various end uses contemplated may also be incorporated in minor amounts into the formulations of the present invention.

The adhesive compositions are prepared by blending the components in the melt at a temperature of about 130°–200° C. until a homogeneous blend is obtained, approximately 2 hours. Various methods of blending are known to the art and any method that produces a homogeneous blend is satisfactory.

The resulting adhesives are characterized by viscosity of less than 8000 cps at 175° C., fiber tearing bonds from Kraft paper within the complete temperature range of −18° C. to +70° C., a Ring and Ball softening point of 100°–130° C., a cloud point less than 140° C. and clarity at 175° C. Moreover, the adhesives possess excellent heat stability as characterized by the 144 hour 350° F. thermal stability test, with no signs of char, skinning or gel formation, and a density of less than about 0.98. As such the adhesives find particular use as packaging adhesives, for example, for sealing cases and cartons which are to be exposed to extreme temperature conditions. In contrast, similar adhesive compositions which use ethylene vinyl acetate as the copolymer produce a cloudy, poor flowing, thermally less stable product not suitable for high speed, rapid-fire hot melt application systems now in commercial use.

EXAMPLES

In the following examples which are provided for illustrative purposes only, all parts are by weight and all temperatures in degrees Celsius unless otherwise noted.

In the examples, all adhesive formulations were prepared in single blade mixer heated to 170° C. by blending the components until homogeneous.

The adhesives were then subjected to various tests simulating the properties needed for successful commercial applications.

Melt viscosities of the hot melt adhesives were determined on a Brookfield Model RVT Thermosel viscometer using a number 27 spindle.

Test specimens for determining elevated temperature peel and shear strengths were prepared as follows: an adhesive bead ½ inch wide was applied at 175° C. to a strip of 50 pound Kraft paper 1 inch wide by 3 inches long across the width of the paper. A second piece of Kraft paper of the same dimensions was immediately placed over the first piece and 200 gram weight placed on top of the composite construction. The compressed adhesive bead width was 1 inch.

Elevated temperature peel and elevated temperature shear were determined by attaching a 100 gram weight to each specimen and placing the specimens in a forced-draft oven. The temperature was raised in 5.5° C. (10° F.) increments from 38° C. the specimens remained at a given temperature for 15 minutes for conditioning. The heating cycle was run until the final bond failed. Each peel and shear specimen was prepared and tested in duplicate. The elevated peel and shear value shown is the average temperature of failure for the two bonds.

Adhesion at 71° C., room temperature (22° C.), 4.4° C., −6° C., −17.8° C. and −28.0° C., where applicable, was determined by applying a ½ inch wide bead of adhesive at 175° C. widthwise to a 2 inch by 3 inch piece of corrugated board and immediately bringing a second piece of board with flutes in the opposite direction into contact. A 200 gram weight was immediately placed on the construction. The boardstock was 275 pound burst strength corrugated board. The bond specimens were placed in an oven at 71° C. and freezers at 4.4° C., −6.7° C., −17.8° C., and −28.9° C. The bonds were separated by hand and a determination made as to the type of failure. Fiber tearing (FT) and non-fiber tearing bonds (NFT) were noted.

The adhesive set time (open time) was determined in the following manner using 50 pound Kraft paper and an adhesive tester that simulates a case sealing line: single flute corrugated 2 inches by 4 inches were placed in the grips of the tester. The bottom specimen was moved forward at a constant speed under the melt nozzle applicator for the application of the adhesive bead and was stopped directly under the top specimen. The vertical cylinder pressure was preset at 1 kgf/cm² and, after a predetermined open time, moved the top specimen downward to contact the lower specimen. Contact was maintained for a given compression time and force after which the top substrate was separated from the lower substrate by reversal of the air flow operating the vertical cylinder. The adhesive bead width was adjusted by a gear pump to give a width of a ⅛ inch following compression. Several tests were carried out under the following conditions: Open time 1 sec, Vertical Cylinder Pressure 1 kgf/cm². The shortest time required to obtain 80% of the adhesive bonds having immediate fiber tearing bonds was reported as set time.

The thermal stability of the adhesive blends was determined in the following manner: 100 grams of adhesive was placed in a clean 8 oz. glass jar and covered with aluminum foil. The jars were then placed in forced-draft ovens at 175° C. or other relevant temperatures and aged covered for 144 hours. After this, the specimen was analyzed for color change and presence of char and nonthermoplastic material (skin or gel) and the viscosity measured. Unusual behavior such as separation and lack of clarity were also noted.

Cloud point is determined by heating the adhesive blends to 175° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other. Products that show cloud points near or at the softening point of the wax used in the formulation reflect an overall compatible product. The cloudiness that develops as the material cools is the result of the developing crystallinity of the waxy component (causing refraction of light passing through the sample). Systems which possess cloud points much greater than the softening point of the wax exhibiting a micro separation changing the refraction index of the molten adhesive. The practical significance of products with high cloud points are as follows:

(1) Poor inherent compatibility with a tendency to phase separation upon prolonged heating and heating and cooling cycling such as is experienced in commercial operations.

(2) Poor flow properties resulting in "stringing" from rapid fire, air actuated nozzle equipment.

Stringing Test Using the same adhesive tester as described in the adhesive set time test, a hot melt adhesive's tendency to string and flow poorly, or cut off poorly can be observed. Using constant orifice size and constant gear pump RPMs the hot melt adhesive was fired onto a sheet of black paper. The temperature of the tank, which in this case was nearly the same as the nozzle temperature, was lowered 5.5° C. (10° F.) at a time. The test was continued until the adhesive begins to string, flow poorly or fail to cut off properly.

EXAMPLE I

This example illustrates the benefits of the use of two adhesives of the present invention (1 and 5) when compared with ethylene vinyl acetate based adhesives (Elvax from DuPont) formulated to provide similar viscosity levels (2 and 6). The adhesives of the invention were also compared to adhesive 3, a terpene phenolic tackified adhesive representative of the products of U.S. Pat. No. 4,816,306 and 4,874,804 as well as with a terpene phenolic tackified adhesive prepared using ethylene vinyl acetate instead of the ethylene n-butyl acrylate polymer. Finally, the adhesives of the invention were compared with a commercially available hot melt adhesive.

TABLE I

| ADHESIVE COMPONENTS | 1 | 2 | 3 | 4 | 5 | 6 | COMMERCIAL HOT MELT |
|---|---|---|---|---|---|---|---|
| Wingtack Extra | — | — | — | — | 46 | 46 | — |
| 400 MI EnBA (35% BA) | 31 | — | 31 | — | 31 | — | — |
| Synthetic Wax (Paraflint H4) | 20 | 20 | 20 | 20 | 20 | 20 | — |
| Elvax 210 (400 MI EVA 28% VA) | — | 31 | — | 31 | — | 31 | — |
| Eastman Resin H100 | 16 | 16 | — | — | — | — | — |
| Eastman Resin H130 | 30 | 30 | — | — | — | — | — |
| Irganox 1010 | 0.5 | 0.5 | 0.5 | 0.5 | 0.5 | 0.5 | — |
| Nirez V2040 HM | — | — | 46 | 46 | — | — | — |

TABLE II

| TEST RESULTS | 1 | 2 | 3 | 4 | 5 | 6 | COMMERCIAL HOT MELT |
|---|---|---|---|---|---|---|---|
| Viscosity @ 350° F. | 910 | 650 | 1130 | 880 | 740 | 535 | 1000 |
| Density @ 24° C. | .97 | .99 | .99 | 1.00 | .94 | .95 | .99 |
| Peel (°C.) | 60 | 60 | 71 | 65 | 60 | 60 | 54° C. |
| Shear (°C.) | 93 | 93 | 88 | 77 | 93 | 88 | 87° C. |
| Open Time (sec) | 1 | 1 | 1 | 1 | 1.5 | 1.5 | 1.5 |
| Stringing noted @ (°C.) | 135° C. | 148° C. | 148° C. | 177° C. | 135° C. | 163° C. | 135° C. |
| Cloud point (°C.) | 98° C. | 138° C. | 129° C. | 165° C. | 103° C. | 135° C. | 130° C. |
| Solid Texture | Flexible | Cohesively weak | Flexible | Cohesively weak | Flexible | Cohesively weak | Flexible |
| ADHESION TO VIRGIN CORRUGATED BOARD | | | | | | | |
| @ 71 | FT | FT | FT | FT | FT | FT | NFT |
| @ 24° C. | FT | FT | FT | NFT | FT | FT | FT |
| 4° C. | FT | NFT | FT | NFT | FT | FT | FT |
| −7° C. | FT | FT | FT | NFT | FT | NFT | NFT |
| −18° C. | FT | NFT | FT | NFT | FT | NFT | NFT |
| −29° C. | FT | FT | FT | FT | FT | FT | NFT |
| ADHESION TO HIGH PERFORMANCE LINER | | | | | | | |
| @ 71 | FT | FT | FT | FT | — | — | NFT |
| @ 24° C. | FT | FT | FT | FT | — | — | NFT |
| 4° C. | FT | NFT | NFT | NFT | — | — | NFT |
| −7° C. | FT | NFT | NFT | NFT | — | — | NFT |
| −18° C. | FT | NFT | NFT | NFT | — | — | NFT |
| −29° C. | FT | NFT | FT | NFT | — | — | NFT |

HEAT STABILITY TESTING 144 HOURS

TABLE II-continued

| TEST RESULTS | 1 | 2 | 3 | 4 | 5 | 6 | COMMERCIAL HOT MELT |
| --- | --- | --- | --- | --- | --- | --- | --- |
| 350° F. COVERED GLASS CONTAINER | | | | | | | |
| Volatile char | None | None | Slight | Slight | — | — | V. Slight |
| Skin/gels | None | None | None | None | — | — | None |
| Smoke/odor | Mild | Mild | Strong | Strong | — | — | Strong |
| Color | Yellow | Dark Yellow | Light Brown | Dark Brown | — | — | Brown |
| % Viscosity change | −.5% | +2% | −.5% | +2% | — | — | +16% |

The results presented in these examples illustrate the superior properties obtained by use of adhesives prepared in accordance with the teachings of the present invention.

Thus, a comparison between adhesives 1 and 3 shows the improved thermal stability of the adhesives of the present invention as compared to adhesives formulated in accordance with the teachings of U.S. Pat. Nos. 4,816,306 and 4,874,804.

A comparison of the adhesives of 1 and 5 to 2 and 6 illustrates the improved high and low temperature performance, improved compatibility as seen by cloud point and solid texture, lower density, and improved machining as demonstrated by the lower temperature at which stringing is noted.

A comparison of 1 and 5 with the Commercial Hot Melt, shows the overall improved performance properties.

Finally, the results presented in Table II illustrate the filterability of the adhesive products of the invention when compared with the compositions of the prior art including those described in the earlier Brady et al patents. In this regard, it is noted in results presented by Evan Wise and Joanne Arnold in the September 1992 Tappi Journal at pages 181 ff., that there is a critical region for the specific gravity of hot melt adhesives between 0.980 and 1.05 wherein such adhesives are virtually impossible to remove efficiently using filtration techniques. As noted in Table II, only the density of the adhesives formulated in accordance with the present invention fell outside this critical region.

We claim:

1. A carton, case or tray formed utilizing a hot melt adhesive composition having a specific gravity less than 0.98 and a viscosity less than 8000 cps at 175° C., said adhesive consisting essentially of:
    a) 20 to 50% by weight of at least one ethylene n-butyl acrylate copolymer containing 25–45% by weight n-butyl acrylate and having a melt index of at least 10;
    b) 30 to 60% of a tackifying resin selected from the group consisting of aliphatic and cycloaliphatic hydrocarbon resins or hydrogenated derivatives thereof and hydrogenated aromatic hydrocarbon resins;
    c) 10 to 30% by weight of a synthetic wax having a melting point above 100° C.; and
    d) 0–1.5% stabilizer.

2. The carton, case or tray of claim 1 wherein the ethylene/n-butyl acrylate copolymer in the adhesive contains 30 to 35% n-butyl acrylate.

3. The carton, case or tray of claim 1 wherein the ethylene/n-butyl acrylate copolymer in the adhesive has a melt index between 100 and 800.

4. The carton, case or tray of claim 1 wherein the tackifying resin in the adhesive has a Ring and Ball softening point of 70° to 150° C.

5. The carton, case or tray of claim 1 wherein the tackifying resin in the adhesive is an aliphatic or cycloaliphatic petroleum hydrocarbon resin or hydrogenated derivative thereof.

6. The carton, case or tray of claim 1 wherein the wax in the adhesive is selected from the group consisting of synthetic, high density, low molecular weight polyethylene waxes and Fischer-Tropsch waxes.

7. The carton, case or tray of claim 6 wherein the wax in the adhesive is a Fischer-Tropsch wax.

8. The carton, case or tray of claim 1 wherein the adhesive contains a blend of an ethylene/n-butyl acrylate copolymer having a melt index of 45 and an ethylene/n-butyl acrylate copolymer having a melt index of 400.

9. The carton, case or tray of claim 1 wherein the adhesive consists essentially of a blend of an ethylene/n-butyl acrylate copolymer having a melt index of 45 and an ethylene/n-butyl acrylate copolymer having a melt index of 400; tackifying resin having a Ring and Ball softening point of 70° to 150° C. and a Fischer-Tropsch wax.

10. The carton, case or tray of claim 1 used for packaging products at temperatures greater than about 40° C., which products will be stored at temperatures less than about −18° C.

11. Hot melt adhesive compositions having a specific gravity less than 0.98, said adhesive consisting essentially of:
    a) 20 to 50% by weight of at least one ethylene n-butyl acrylate copolymer containing 25–45% by weight n-butyl acrylate and having a melt index of at least 10;
    b) 30 to 60% of a tackifying resin selected from the group consisting of aliphatic and cycloaliphatic hydrocarbon resins or hydrogenated derivatives thereof and hydrogenated aromatic hydrocarbon resins;
    c) 10 to 30% by weight of a synthetic wax having a melting point above 100° C.; and
    d) 0–1.5% stabilizer;
    said adhesive characterized by a viscosity of less than 8000 cps at 175° C., fiber tearing bonds from Kraft paper within the range of 0° to 160° F., a Ring and Ball softening point of 100°–130° C., a cloud point less than 140° C., clarity at 170° C. and being capable of surviving a 144 hour covered thermal stability test for 144 hours with no char, skinning or gel formation.

12. The adhesive of claim 11 wherein the ethylene/n-butyl acrylate copolymer in the adhesive contains 30 to 35% n-butyl acrylate.

13. The adhesive of claim 11 wherein the ethylene/n-butyl acrylate copolymer has a melt index between 100 and 800.

14. The adhesive of claim 11 wherein the tackifying resin has a Ring and Ball softening point of 70° to 150° C.

15. The adhesive of claim 11 wherein the tackifying resin is an aliphatic or cycloaliphatic petroleum hydrocarbon resin or hydrogenated derivative thereof.

16. The adhesive of claim 11 wherein the wax is selected from the group consisting of synthetic, high density, low molecular weight polyethylene waxes and Fischer-Tropsch waxes.

17. The adhesive of claim 11 containing a blend of an ethylene/n-butyl acrylate copolymer having a melt index of 45 and an ethylene/n-butyl acrylate copolymer having a melt index of 400.

18. The adhesive of claim 11 consisting essentially of a blend of an ethylene/n-butyl acrylate copolymer having a melt index of 45 and an ethylene/n-butyl acrylate copolymer having a melt index of 400; a tackifying resin having a Ring and Ball softening point of 70° to 150° C. and a Fischer-Tropsch wax.

* * * * *